Patented May 11, 1937

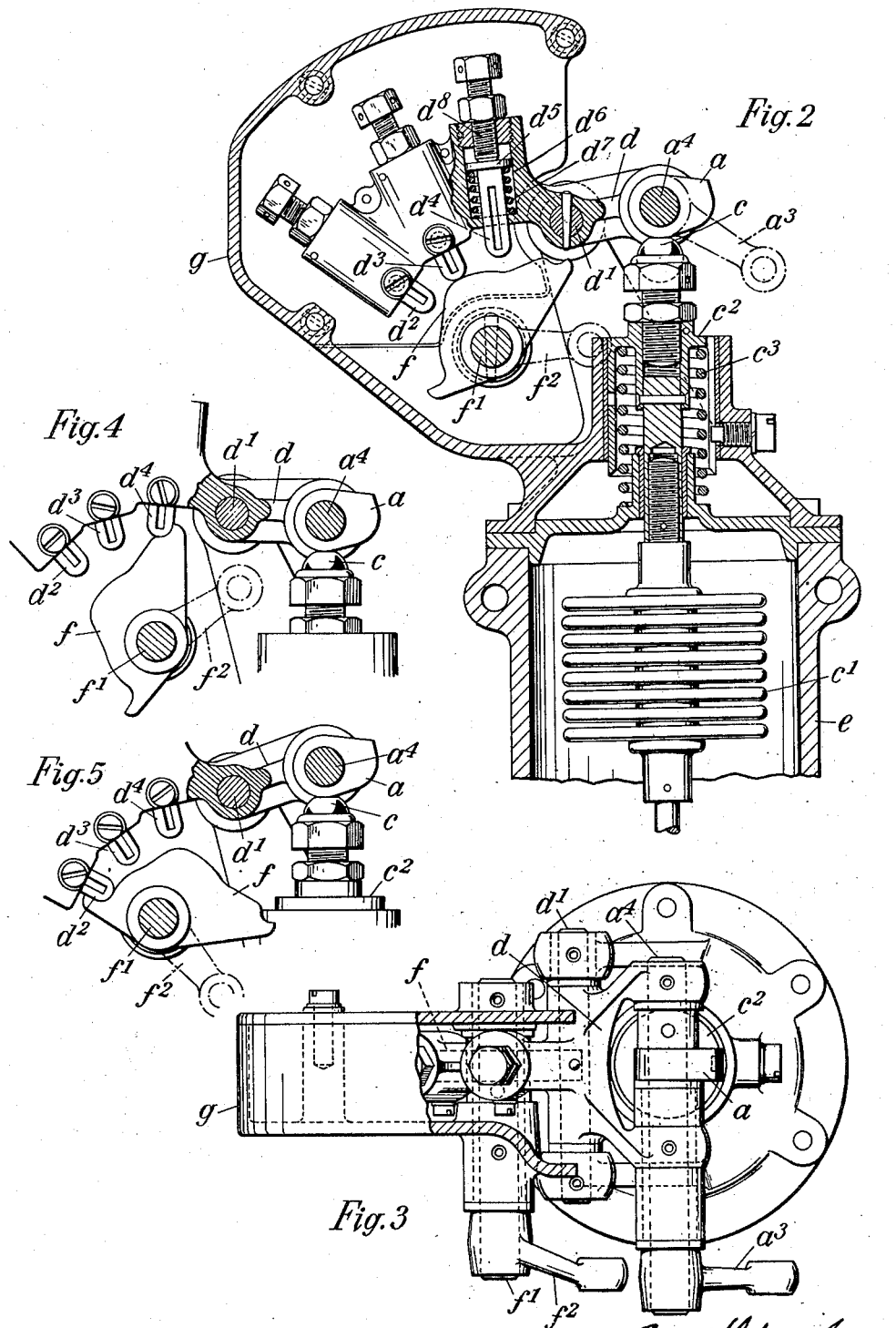

2,079,958

UNITED STATES PATENT OFFICE 2,079,958

MEANS FOR CONTROLLING INTERNAL COMBUSTION AIRCRAFT ENGINES

Edward Dodson, Streatham, London, England

Application July 13, 1936, Serial No. 90,428
In Great Britain September 24, 1935

8 Claims. (Cl. 123—75)

This invention relates to means for controlling supercharged or other high compression ratio aircraft engines (hereinafter referred to as supercharged aircraft engines for brevity) of the type in which a pressure sensitive device is enclosed within a chamber, and is exposed to the charging pressure, said pressure sensitive device acting automatically to control the throttle valve in order to prevent this valve from being opened more than is safe for a given altitude. Such a device is usually referred to as a "boost control".

In my prior United States Patent No. 1,995,800 there is described a boost control of this type in which the pilot's throttle control is connected with means for changing the datum (i. e. adjusting the controlling effect) of the boost control in such a manner as to increase the induction pressure as the throttle control moves towards the full throttle position.

The object of this invention is to prevent the pilot from obtaining high supercharging pressure when the mixture control lever is set in a weak position.

According to this invention, in means for controlling supercharged or other high compression ratio aircraft engines of the type specified above means is provided for changing the datum of the boost control both by the throttle control and also by the mixture control in order to prevent a predetermined maximum charging pressure from being exceeded when the mixture control is in a weak position. The predetermined charging pressure would be such that it is not too high to be safely used with a mixture strength appropriate to that which would be obtained when the mixture control is in its weak position.

The means for changing the datum of the boost control may consist of a mechanical device for mechanically shifting the pressure sensitive device as described in my aforesaid prior patent specification, this device being not only connected to the throttle control but being also connected to the mixture control in such a manner that when this control is moved to its weak position the pressure sensitive device of the boost control is shifted.

In the case where the throttle control is connected with a cam or like device (hereinafter termed the throttle controlled cam) for changing the datum of the boost control as the throttle lever moves towards the full throttle position, a means may be provided for altering the position of this throttle controlled cam, which means is operably connected with the mixture control. For instance, a cam or like controlling device (hereinafter termed a mixture control cam) operably connected with the mixture control may be provided for altering the position of the throttle controlled cam. In a case where the mixture control is arranged to be set in any one of three different positions, one giving the ordinary mixture strength for normal boost conditions, the second giving an extra rich mixture for take-off and emergency boost conditions and the third an ultra weak mixture for cruising conditions with a reduced power output, the mixture control cam may have three cam portions or phases (hereinafter termed portions for brevity) which are arranged to be brought into action in turn by the movement of the mixture control, so that at any position of the mixture control only one of said cam portions will be in operation. Thus the mixture control cam in changing the position of the throttle controlled cam will move the throttle controlled cam into one of three positions relatively to each of which the throttle controlled cam will act independently to vary the datum of the boost control in accordance with the position of the throttle control so that the mixture control will in effect provide three separate and distinct ranges over which the datum of the boost control can be varied by the movement of the throttle control.

Alternatively, the datum of the boost control may be changed by providing it with an air leak device for controlling the pressure in the chamber of the boost control, said air leak device being operably connected with the mixture control.

By suitably arranging the air leak device this also, in the case where the mixture control is provided with three positions as previously explained, can be arranged to provide three different ranges in which the datum of the boost control can be changed by the position of the throttle control, the range of control being determined by the position of the mixture control.

As practical embodiments of the invention, examples of the two ways of effecting the required controls according to this invention will be described with reference to the accompanying drawings, in which:—

Fig. 2 is a sectional elevation of the top of the boost control drawn to an enlarged scale and showing one position of the mixture control cam.

Fig. 3 is a plan of the boost control.

Figs. 4 and 5 illustrate diagrammatically two further positions of the mixture control cam beyond that shown in Fig. 2.

Figure 1:
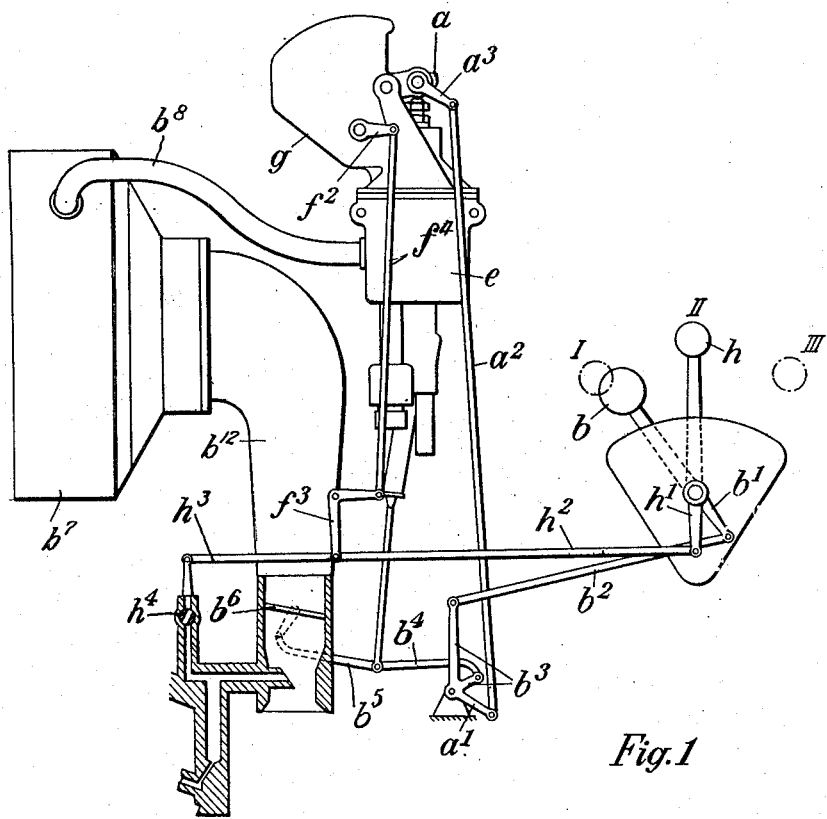
Fig. 1 is a diagram of the controls according to this invention, in which the controls act mechanically.

In the mechanical means shown in Figs. 1 to 5 of the drawings, a throttle controlled cam $a$ is operably connected to the throttle control $b$ by means of the arm $b^1$ on said control, the link $b^2$, the bell crank lever $b^3$, arm $a^1$, link $a^2$, and arm $a^3$ fixed on the spindle $a^4$ of the cam $a$. Thus the extension $c$ of the aneroid $c^1$ of the boost control is moved by the cam $a$ in accordance with the movement of the throttle control, said extension $c$ being provided with a cap $c^2$ against which acts a spring $c^3$ for holding said extension into contact with the cam.

The spindle $a^4$ of the throttle controlled cam is mounted on one end of an adjusting means comprising a lever $d$ pivoted at $d^1$, which lever permits the spindle $a^4$ to be raised and lowered relatively to the aneroid chamber $e$. The position of the spindle $a^4$ is controlled by forming the opposite end of the lever $d$ with three adjustable pins $d^2$, $d^3$, $d^4$ adapted to engage with a three-step cam $f$ rockably supported in a hood portion $g$ fixed to the top of the aneroid chamber and partly surrounding the operating mechanism. This cam is so formed that only one of the pins $d^2$, $d^3$, $d^4$ is in contact with the cam at any time. Each step in the cam is arranged to control its own particular pin. The cam is mounted on a spindle $f^1$ which extends through the hood-like casing and said spindle is provided on the outside of said casing with an arm $f^2$ which is operably connected to the mixture control $h$ through the arm $h^1$ on the mixture lever, link $h^2$, bell crank lever $f^3$ and link $f^4$. When the mixture control $h$ is in the central position shown in Fig. 1, the cam $f$ will be in the position shown in Fig. 2 in which its middle step is in engagement with the middle pin $d^3$ and the control lever $d$ then moves the throttle control cam into such a position that it will operate through what may be termed the normal boost range, which is the range of charging pressure obtained with the boost control claimed in my aforesaid patent specification. The bell crank lever $b^3$ is operatively connected through the toggle links $b^4$, $b^5$ with the throttle valve $b^6$, while the bell crank lever $f^3$ is connected through the link $h^3$ with the mixture control valve $h^4$. The supercharger $b^7$ is in communication with the aneroid chamber $e$ through the pipe $b^8$. Although in the Fig. 1 diagram, which is introduced solely for the purpose of explaining the working of the means for changing the datum, the link $h^3$ is shown for the said purpose and for simplicity as being attached directly to the mixture control valve $h^4$, yet in actual practice the valve $h^4$ must be provided with a known form of automatic altitude control by which the said valve will be operated in accordance with changes in atmospheric pressure to correct the fuel/air ratio for altitude, and the link $h^3$ will be connected to a setting means for said automatic altitude control so that the mixture control $h$ will vary the range of the automatic altitude control to make it operate automatically over a rich range for any altitude or automatically over a weak range for any altitude, according to the position in which the said setting means is adjusted by the mixture control. The mixture control lever in the embodiment illustrated has three positions marked I, II and III, position I being the take-off position, II being the normal mixture position and III being the ultra weak position. If now, the mixture lever is moved from the central position II to position I, the cam $f$ will be moved into the position shown in Fig. 4 in which the highest step engages with the pin $d^4$ and thus the throttle controlled cam will be lower relatively to its normal position and this will cause the aneroid $c^1$ to be bodily depressed into a position in which it will increase the boost pressure and cause the throttle controlled cam to change the datum of the boost control over a range of pressures which are higher than the normal boost range in accordance with variations of the throttle control.

If, on the other hand, the pilot moves his mixture control to the weak mixture position III, the mixture controlled cam $f$ will be moved into the position shown in Fig. 5 in which its lowest step engages with the pin $d^2$ and in which both the other pins $d^3$ and $d^4$ are clear of the cam so that the arm of the lever carrying the pins will fall and the end of the lever carrying the throttle controlled cam will be raised owing to the action of the spring $c^3$ in order to allow the aneroid to move upwardly to a position in which the boost pressure is lower than normal and is low enough to enable the engine to run safely on a very weak mixture. In this last position, the throttle controlled cam will again operate to permit the datum of the boost control to be changed in accordance with the movement of the throttle control but the range of pressures will be lower than that of the normal range.

The extension $c$ on the cap $c^2$ of the aneroid is in the form of a screw tappet adapted to be actuated by the throttle controlled cam, this screw tappet permitting of the setting adjustment of the aneroid relatively to the throttle controlled cam in order to permit of adjustment of the boost control in the normal boost range. Similar adjustment of the pressures in the take-off range and the cruising range relatively to those in the normal boost range can be effected by adjusting the pins $d^2$ and $d^4$ relative to the pin $d^3$ which controls the mechanism in the normal boost range. Adjustment for the normal boost range may also be effected by adjusting the pin $d^3$ or aternatively this pin may be made a fixture in the arm of the control lever and adjustment may be confined to the screw tappet $c$. In order to permit of adjustment of the pins, these are arranged as shown in Fig. 2 as regards the pin $d^4$ which is mounted on a piston $d^5$ slidable in a cylindrical part $d^6$ in the lever, said piston being maintained by a spring $d^7$ in contact with the adjusting screw $d^8$ by which the position of the pin can be adjusted. Similar adjustment means may be provided for the pins $d^2$ and $d^3$.

In an alternative construction of this mechanical means instead of providing a single three-step cam, three separate cams may be mounted on the same spindle, each cam having a suitable contour and in this case the three pins would be mounted in a plane parallel to the axis of said spindle on which the cams are mounted instead of being mounted in a plane perpendicular to said axis, as in the construction hereinbefore described and illustrated in the accompanying drawings.

In the pneumatic means for changing the datum in accordance with the position of the mixture control as shown in Figs. 6 to 12 of the drawings, the chamber $e$ of the aneroid $c^1$ is closed at its bottom by a cover plate $e^1$ (Fig. 12), to which chamber air under pressure from the pressure side of the supercharger $b^7$ is supplied through the pipe $b^{10}$, and is provided with an air leak device which will permit of two definite and predetermined rates of leakage and also a cut-off position in which there will be no leakage at all, so as thereby to provide three ranges for the control of the boost pressure.

In this construction, the air leak device comprises an inlet $i$ to which is connected the pipe $b^{10}$ from the pressure side of the supercharging blower, this inlet communicating through the port $i^{12}$ with a vertical passage $i^{13}$ having an interchangeable jet $i^1$ with a sharp edged orifice, and a needle valve $i^2$ is provided by which the size of said orifice can be regulated. The inlet communicates through this orifice with a passage $i^3$ extending across the device and communicating with a port $i^4$ in a chamber $i^5$ containing a rotatable cock $j$. The passage $i^3$ also communicates with a by-pass passage $i^6$ intermediate the inlet and the cock, said by-pass passage having an interchangeable jet $i^7$ with a sharp edged orifice and a needle valve $i^8$ for regulating the size of said orifice. This by-pass passage communicates with a port $i^9$ in the chamber $i^5$ on the opposite side of the cock $j$. The rotatable cock itself is provided with two radial ports $j^1$, $j^2$ so arranged that these ports cannot coincide with both of the ports $i^4$, $i^9$ in the cock chamber at the same time, said radial ports both communicating with an axial outlet $j^3$, which outlet communicates with an outlet pasage $i^{10}$ containing a venturi $k$ or like restriction. The outlet passage is connected to a pipe $b^{11}$ by which it is communicated to the induction pipe $b^{12}$ on the suction side of the supercharging blower. The shank $j^4$ of the rotatable cock is provided with an arm $j^5$ which is connected by suitable mechanism such as the link $h^5$ to the arm $h^1$ on the pilot's mixture control. A passage $i^{11}$ is provided communicating said passage $i^3$ with the interior of the capsule chamber $e$ for communicating the pressure of said passage $i^3$ to the said chamber.

In this construction, the means for changing the datum in accordance with the movements of the pilot's throttle control consists of a throttle controlled cam $l$ adapted to act on a spring pressed cap $l^1$ on top of the aneroid chamber $e$, said cam being mounted on a spindle $l^2$ which is provided with an arm $l^3$ which is connected by a suitable mechanism such as that shown in Fig. 1 and comprising the link $a^2$, arm $a^1$, bell crank lever $b^3$ and link $b^2$ to the pilot's throttle control.

Figure 6:
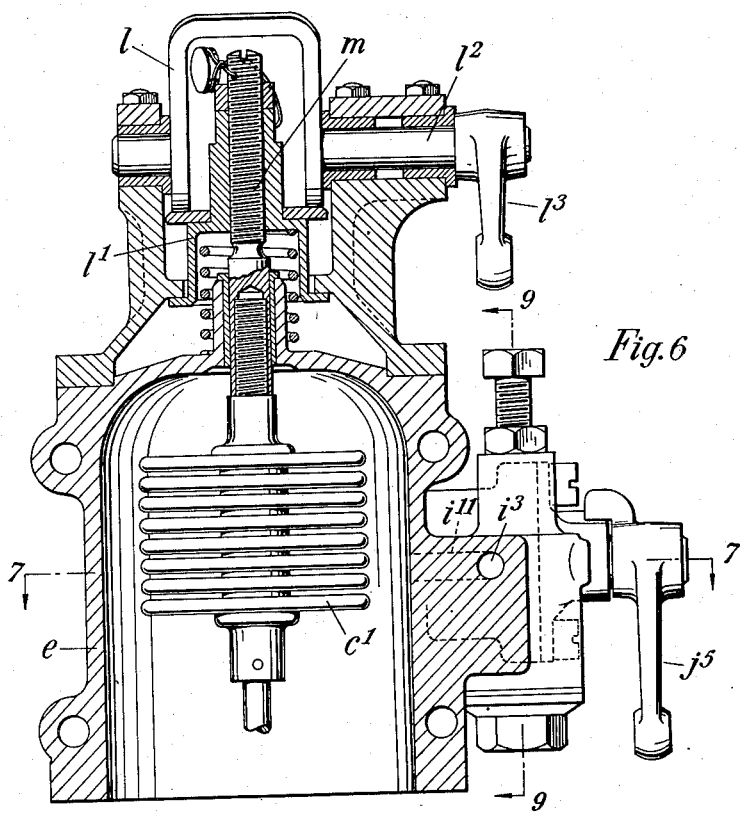
Fig. 6 is a similar view to Fig. 2 but illustrates an embodiment for effecting the control pneumatically, i. e. by means of an air leak.
Figure 7:
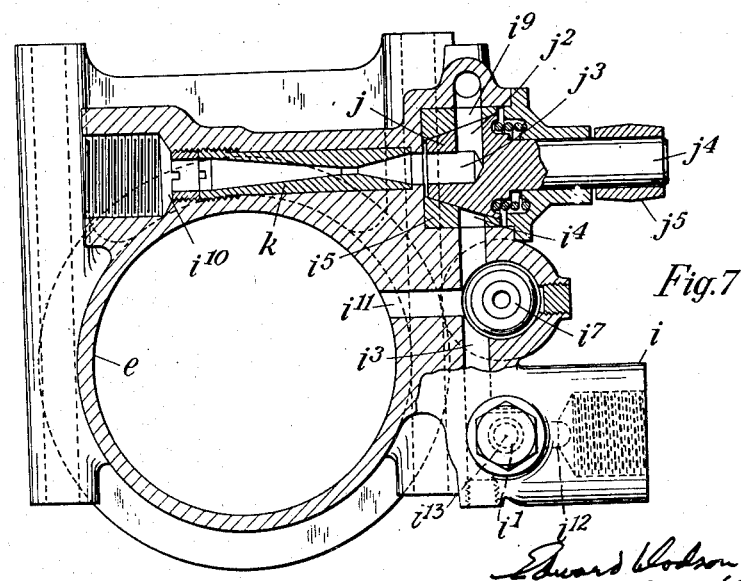
Fig. 7 is a plan of the embodiment shown in Fig. 6 partly in section on the line 7—7 in Fig. 6.
Figure 8:
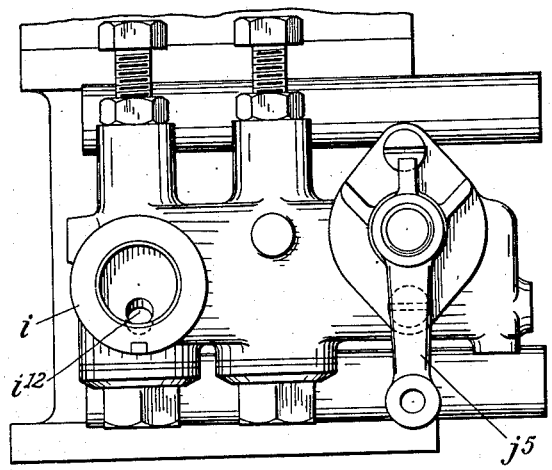
Fig. 8 is a side elevation of a fragment of Fig. 6 illustrating the arm for operating the control valve.
Figure 9:
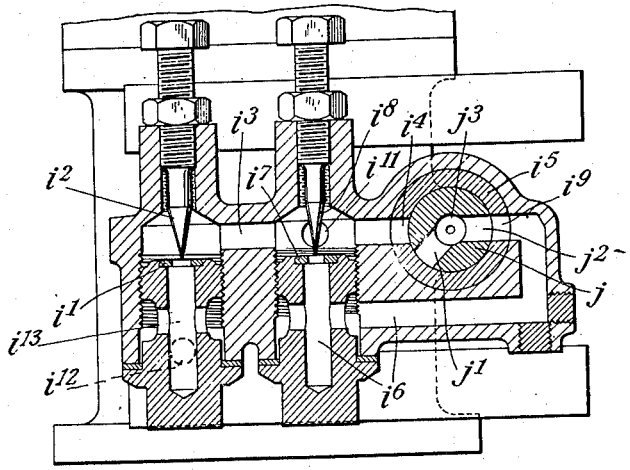
Fig. 9 is a section on the line 9—9 in Fig. 6 looking in the direction of the arrows and showing the control valve in one position.

With this pneumatic means, when the mixture control is in its central normal mixture position marked II in Fig. 1, the arm $j^5$ of the cock will also be in its central position as shown in Figs. 6 and 9 of the accompanying drawings. In this position, which is that shown in Figs. 7 and 9, the port $j^2$ in the rotatable cock coincides with the port $i^9$ of the by-pass passage, so that the compressed air will flow through the orifices in the two jets $i^1$, $i^7$, through the by-pass passage and then out through the cock and the Venturi control outlet so that the supercharging pressure will be allowed to escape at a certain predetermined rate, which rate of discharge will determine the pressure communicated to the aneroid chamber and thus permit the aneroid to control the supercharging pressure within a certain range which may, for convenience, be termed the normal boost range.

Figure 10:
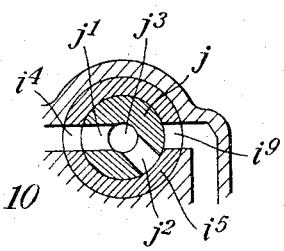
Figs. 10 and 11 are similar views of the same control valve as shown in Fig. 9 but showing it in two further positions.

If now, the mixture control is moved to the take-off position marked I in Fig. 1, the rotatable cock will be moved into the position shown in Fig. 10, in which its port $j^1$ will coincide with the main passage $i^3$ so that the air entering the main passage only flows through the orifice in the jet $i^1$ before passing out through the cock and the Venturi controlled outlet. Thus the rate of discharge of the supercharging pressure will be increased and the pressure communicated to the aneroid chamber will be correspondingly reduced to give a different range of control for the aneroid which might, for convenience, be termed the take-off boost range.

Figure 11:
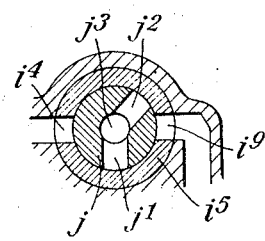
Figure 12:
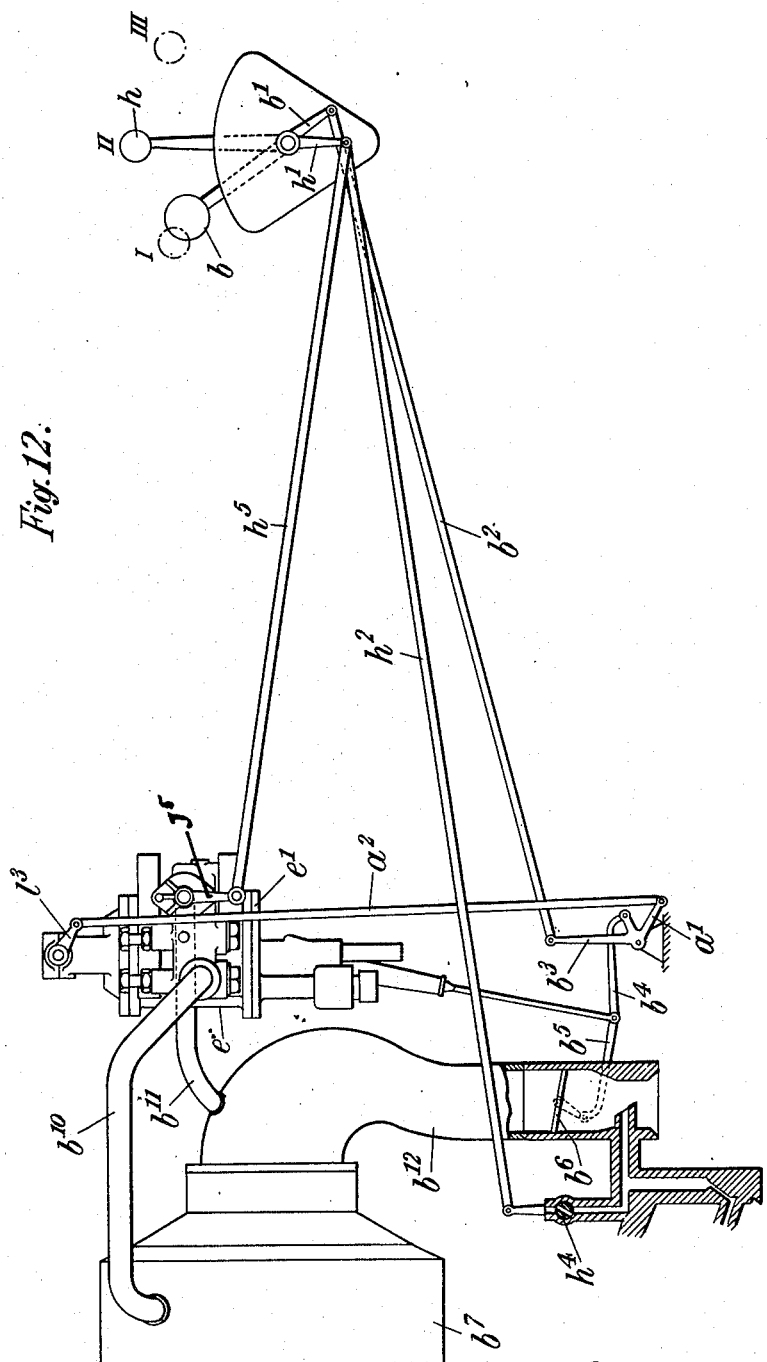
Fig. 12 is a diagram of the controls in the pneumatic embodiment illustrated in Figs. 6 to 11.

If now, the mixture control is moved into the weak mixture position marked III in Fig. 1, then the rotatable cock will be moved into the position shown in Fig. 11 so that it closes the ports $i^4$ and $i^9$ communicating with both the main passage and the by-pass passage so that no leakage of the pressure occurs and the supercharging pressure of the blower is communicated to the aneroid to provide a third range which may conveniently be referred to as the cruising boost range.

It will be understood that the position of the aneroid within any of these ranges can be varied in accordance with the position of the throttle control by means of the cam $l$ mounted on top of the aneroid chamber.

It will also be understood that the needle valve $i^8$ controlling the orifice to the by-pass passage $i^6$ must be so adjusted that the effective pressure through this orifice is smaller in area than the orifice in the passage in order to ensure a different range of flow when the gas flows through both orifices than when it only flows through the one. In this case an adjustment screw $m$ is provided between the aneroid and its cap $l^1$, which screw permits the aneroid to be raised or lowered relatively to the cap to permit adjustment of the aneroid so as to enable this to be adjusted to give the required pressure in the aneroid chamber for the cruising boost range.

What I claim as my invention and desire to secure by Letters Patents is:—

1. A throttle control for supercharged aircraft engines comprising, a pilot's throttle control, an induction throttle valve, means connecting said control to said valve, a boost control connected to said connecting means arranged to vary the position of the said throttle valve relatively to that of the said throttle control according to altitude, means for changing the datum of said boost control, a mixture control adapted to vary the strength of the mixture supplied to the engine, and means for operating said datum changing means by the pilot's throttle control and by the mixture control, whereby a predetermined maximum charging pressure is prevented from being exceeded when said mixture control is in a weak position.

2. A throttle control for supercharged aircraft engines comprising, a pilot's throttle control, an induction throttle valve, means connecting said control to said valve, a boost control connected to said connecting means arranged to vary the position of the said throttle valve relatively to that of the said throttle control according to altitude, a mechanical device adapted to change the datum of said boost control; a mixture control adapted to vary the strength of the mixture supplied to the engine, and means for operatively connecting said mechanical device to said pilot's throttle control and to the mixture control, whereby a predetermined maximum charging pressure is prevented from being exceeded when said mixture control is in a weak position.

3. A throttle control for supercharged aircraft engines comprising, a pilot's throttle control, an induction throttle valve, means connecting said control to said valve, a boost control connected to said connecting means arranged to vary the position of the said throttle valve relatively to that of the said throttle control according to altitude, a throttle controlled cam for changing the datum of said boost control, means operatively connecting said throttle control to the said throttle controlled cam, a mixture control adapted to vary the strength of the mixture supplied to the engine, adjusting means for altering the position of said throttle controlled cam independently of the said throttle control and means operatively connecting said adjusting means to said mixture control.

4. A throttle control for supercharged aircraft engines comprising, a pilot's throttle control, an induction throttle valve, means connecting said control to said valve, a boost control connected to said connecting means arranged to vary the position of the said throttle valve relatively to that of the said throttle control according to altitude, a throttle controlled cam for changing the datum of said boost control, means operatively connecting said throttle control to the said throttle controlled cam, a mixture control adapted to vary the strength of the mixture supplied to the engine, a mixture controlled cam for altering the position of said throttle controlled cam independently of the said throttle control and means operatively connecting said mixture controlled cam to said mixture control.

5. A throttle control for supercharged aircraft engines comprising, a pilot's throttle control, an induction throttle valve, means connecting said control to said valve, a boost control connected to said connecting means arranged to vary the position of the said throttle valve relatively to that of the said throttle control according to altitude, a throttle controlled cam for changing the datum of said boost control, means operatively connecting said throttle control to the said throttle controlled cam, a mixture control adapted to be set in any one of a plurality of different positions in order to vary the strength of the mixture supplied to the engine, a mixture controlled cam for moving said throttle controlled cam into a plurality of different positions independently of the said throttle control and means operatively connecting said mixture controlled cam to said mixture control so that the position of the throttle controlled cam is determined by the position of the mixture control.

6. A throttle control for supercharged aircraft engines comprising, a pilot's throttle control, an induction throttle valve, means connecting said control to said valve, a boost control connected to said connecting means arranged to vary the position of the said throttle valve relatively to that of the said throttle control according to altitude, a throttle controlled cam for changing the datum of said boost control, means operatively connecting said throttle control to the said throttle controlled cam, a mixture control adapted to be set in any one of three different positions, namely an ordinary mixture strength position for normal boost conditions, an extra rich mixture position for take-off and emergency conditions and an ultra weak mixture position for cruising conditions, in order to vary the strength of the mixture supplied to the engine, a mixture controlled cam for altering the position of said throttle controlled cam independently of the said throttle control, said mixture controlled cam having three cam portions adapted to be brought into action in turn so that in any position of the cam only one of said portions will be in operation and means operatively connecting said mixture controlled cam to said mixture control.

7. A throttle control for supercharged aircraft engines comprising, a pilot's throttle control, an induction throttle valve, means connecting said control to said valve, a boost control connected to said connecting means arranged to vary the position of the said throttle valve relatively to that of the said throttle control according to altitude, an air leak device for changing the datum of said boost control, a mixture control adapted to vary the strength of the mixture supplied to the engine, and means for operating said air leak device by the mixture control, whereby a predetermined maximum charging pressure is prevented from being exceeded when said mixture control is in a weak position.

8. A throttle control for supercharged aircraft engines comprising, a pilot's throttle control, an induction throttle valve, means connecting said control to said valve, a boost control connected to said connecting means arranged to vary the position of the said throttle valve relatively to that of the said throttle control according to altitude, an air leak device for changing the datum of said boost control, said air leak device being arranged to provide a plurality of ranges in which the datum of the boost control can be varied by the throttle control, a mixture control adapted to be moved into any one of a plurality of positions in order to vary the strength of the mixture supplied to the engine, and means for operating said air leak device by the mixture control so that the range of control is determined by the position of said mixture control.

EDWARD DODSON.